United States Patent [19]
Hughes

[11] 3,889,139
[45] June 10, 1975

[54] LINEAR MOTOR ACTUATOR

[75] Inventor: Gordon F. Hughes, Los Angeles, Calif.

[73] Assignee: Xerox Corporation, Stamford, Conn.

[22] Filed: Feb. 14, 1974

[21] Appl. No.: 442,727

[52] U.S. Cl. .................................. 310/13; 310/27
[51] Int. Cl. ........................................... H02k 41/02
[58] Field of Search ...................... 310/13, 27, 12; 179/114–120

[56] References Cited
UNITED STATES PATENTS

| | | | |
|---|---|---|---|
| 3,161,793 | 12/1964 | Laithwaite | 310/27 |
| 3,467,925 | 9/1969 | Masuda | 310/27 X |
| 3,505,544 | 4/1970 | Helms | 310/3 |
| 3,659,124 | 4/1972 | Lathrop | 310/27 X |
| 3,723,779 | 3/1973 | Gillum | 310/13 |
| 3,723,780 | 3/1973 | Gillum | 310/13 |
| 3,743,870 | 7/1973 | Hunt | 310/13 |
| 3,751,693 | 8/1973 | Gabor | 310/13 |

FOREIGN PATENTS OR APPLICATIONS

| | | | |
|---|---|---|---|
| 789,725 | 1/1958 | United Kingdom | 310/27 |
| 789,726 | 1/1958 | United Kingdom | 310/27 |

*Primary Examiner*—Donovan F. Duggan
*Attorney, Agent, or Firm*—James J. Ralabate; Franklyn C. Weiss; Robert E. Cunha

[57] ABSTRACT

An improved linear magnetic actuator for use in a disk drive is described. High performance linear magnetic actuators are required in disk drive units to move read/write heads quickly and accurately from one track on a disk file to another. A powerful magnetic field for use in a magnetic actuator can be produced at relatively low cost by using flat slab magnets. An outer pole of square outside dimensions, and with a central circular bore, is used to transmit the magnetic lines of force from the flat magnets to the circular coil winding. A single turn shorted copper sleeve is plated onto the bore surface of the outer pole to minimize coil winding inductance. Four stationary center poles are positioned inside the movable coil assembly to provide a path for the magnetic lines of force to the ends of the magnetic actuator, from there to the bottom, side and top plates of the magnetic actuator, and finally back to the magnets to complete the magnetic circuit. Each center pole has a gap positioned at its approximate center so that under high current conditions saturation will occur at the gap of the center pole and not elsewhere in the magnetic actuator, thus preventing a distortion of the permanent magnetic field under high current conditions. The actuator is completely encased in flat steel plates to prevent the generation of stray magnetic fields.

9 Claims, 6 Drawing Figures

PATENTED JUN 10 1975         3,889,139

SHEET 2

LINEAR MOTOR ACTUATOR

BACKGROUND OF THE INVENTION

Disk files and disk drives are commonly used in data processing systems for the storage of data and programs. The performance of a disk drive is dependent upon the speed with which a magnetic actuator can position a read/write head over a particular track of the disk. This invention relates to improvements in the structure of such a magnetic actuator which will result in improved performance.

A typical linear magnetic actuator consists of a set of magnets, inner and outer pole pieces, and a coil assembly positioned between said inner and outer pole pieces and attached to a shaft which ultimately drives the carriage on which the read/write heads are mounted. The performance of the magnetic actuator is dependent upon the seek time, that is the time required for the actuator to drive the read/write heads from one track to another on the disk. This seek time may be minimized by either increasing the strength of the magnetic field in which the coil assembly operates, by decreasing the inductance of the coil windings thereby allowing a faster build-up of drive current, and by decreasing the weight of the coil assembly which would increase the reaction time of the head positioning apparatus for a given amount of coil winding current and force. Finally, the entire actuator mechanism must be produced at a competitive cost.

The coil assembly may either be of round or square cross sectional area. A circular coil assembly was selected for this embodiment since a circular surface has good ridigity per unit area, has good vibration characteristics, and generally can be fabricated easily to produce an inexpensive part. Also, a wire wound around a non-circular form tends to crack at the point where it is bent around a small radius. The problem of maintaining a minimum but uniform clearance between cylindrical coil assembly and the inner surface of the outer pole is also simplified by the use of components that can be machined to circular configurations. This clearance must be kept as small as possible to maximize the magnetic field strength through the coil winding.

However, magnets with flat surfaces and rectangular cross sectional areas are less expensive to manufacture than circular surfaces and may be made from a wider variety of magnetic materials.

These conflicting requirements have lead to a multiplicity of structures used in the magnetic actuator prior art. Some examples are found in U.S. Pat. Nos. 3,505,544; 3,666,977, and 3,576,454.

Performance may be improved by limiting the inductance of the coil windings, thereby allowing a more rapid buildup of coil winding current. A common method of limiting this inductance is through the use of a bucking coil wound such that the magnetic field in the bucking coil offsets the magnetic field in the coil winding thereby reducing coil winding inductance. An alternative is to use a stationary conducting sleeve directly inside the coil winding. A bucking current is induced within this sleeve and produces the same effect as would have been produced by a bucking coil. Some examples are U.S. Pat. Nos. 3,743,870 and 3,745,386.

When large currents are induced in the coil winding, and particularly when the coil assembly is at one extreme or the other of its length of travel, the magnetic field of the coil assembly may distort the permanent magnetic field thereby resulting in non-uniform performance of the magnetic actuator. This usually results in impaired performance of the magnetic actuator, and makes the design of a stable control loop more difficult.

Another common problem associated with magnetic actuators and disk drive equipment is that the large magnetic fields created by the coil winding current and permanent magnets generate stray magnetic fields which may be felt at a distance from the magnetic actuator, interfering with the operation of the associated circuitry in the remainder of the disk drive.

SUMMARY OF THE INVENTION

In order to be able to utilize ceramic magnets instead of Alnico, and in order to decrease cost and shorten delivery time, magnets of rectangular cross sectional area were chosen for the preferred embodiment. In general, magnets of rectangular cross sectional area are less expensive to manufacture, more resistant to fracture and may be made from a wider variety of magnetic materials to more percise tolerances. On the other hand, a coil assembly of circular cross section 1 area was choosen because of its lightness, rigidity, and its ease of manufacture. To conduct the magnetic lines of force efficiently from the flat magnets to the cylindrical coil assembly, an outer pole is used which is fabricated from a single piece of mild steel stock having flat outer surfaces onto which the magnets are attached, and an inner longitudinal cylindrical bore slightly larger than the outside diameter of the coil assembly and in which the coil assembly may be mounted. This outer pole also serves to equalize "hot spot" magnetic nonuniformities over the magnetic surfaces. Four stationary mild steel center poles of large cross sectional area are located within said movable coil assembly to conduct the magnetic lines of force forward or backward to the ends of the magnetic actuator. Finally, to complete the circuit, steel plates surround the magnetic actuator on top, sides and bottom. These plates also shield the magnetic actuator to prevent the escape of stray magnetic and electromagnetic fields.

To keep peak currents in the coil winding from creating a saturating magnetic field around the closed magnetic path, each center pole contains an air gap approximately at its center point which substantially reduces the cross sectional area of the center pole at this point. Under peak current conditions, the center pole saturates at the air gap rather than at some other point in the magnetic actuator thus preventing the distortion of the permanent field under peak current conditions.

To minimize the coil winding inductance, a copper sleeve is plated onto the bore surface of the outer pole. During current buildup in the coil winding a counter current is induced in this copper sleeve which reduces the impedance of the coil winding, and allows a rapid current buildup in the winding which results in higher performance for the magnetic actuator.

It is therefore an object of this invention to produce a magnetic actuator which can utilize flat slab magnets in its construction.

Another object of this invention is to produce a magnetic actuator whose performance is not dependent upon shaft position or coil winding current and polarity.

Another object of this invention is to produce a magnetic actuator containing a coil winding of reduced inductance through the use of a copper sleeve immediately surrounding the coil winding.

Another object of this invention is to produce a magnetic actuator which will generate a minimum of stray magnetic fields at a distance from said magnetic actuator.

DETAILED DESCRIPTION OF THE INVENTION

Figure 1:
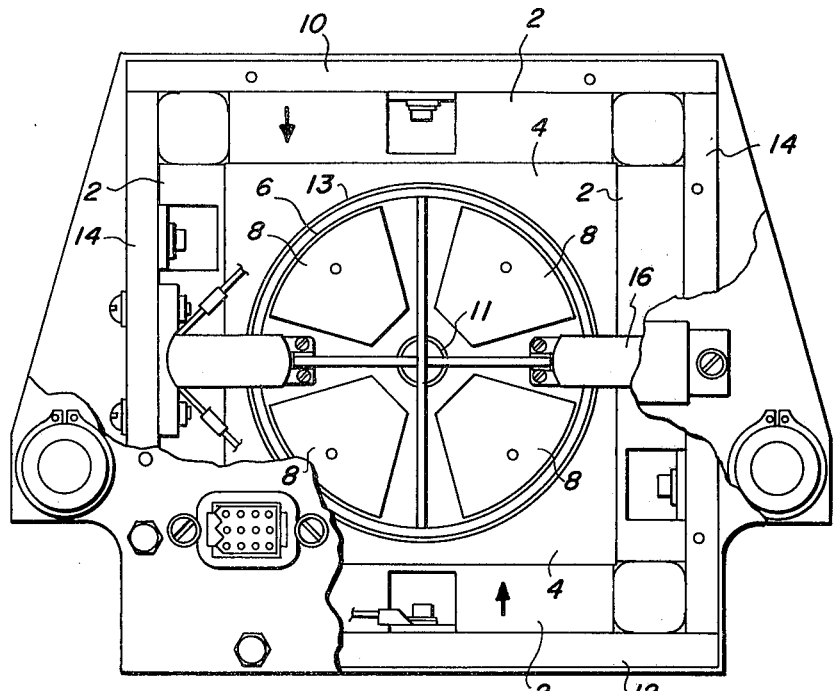
FIG. 1 is a front cross sectional view of the magnetic actuator.

Referring to FIG. 1, four slab magnets 2 supply the permanent magnetic field for this magnetic actuator. In the preferred embodiment these magnets are 6 by 6 by 1 inch thick and are made of barium ferrite. However, because of the lack of curved surfaces, these magnets could be made of any high coercivity magnetic material and are easily manufacturable.

The magnetic lines of force are conducted inward through the outer pole 4 which is machined from a single piece of mild steel stock. The external dimensions of the outer pole are 6 by 6 by 6.25 inches and it is fitted directly against the magnets 2. A longitudinal bore through the outer pole 4 has a diameter slightly larger than the diameter of the coil assembly 6. The coil assembly is a self-supporting rectangular aluminum wire structure, and carries the actuator current.

Four center poles 8 run longitudinally through the coil assembly and are attached to a front plate 18 and a back plate 20, not shown in FIG. 1. These front and back plates are attached to the top plate 10, the bottom plate 12 and two side plates 14. Thus, it can be seen that the magnetic lines of force flow through the magnets 2, in the direction of the arrows, inwardly through the outer pole 4, through the windings of the coil assembly 6 into the center poles 8. In the center poles 8 the magnetic lines of force divide, with half the lines flowing forward into the front plate 18 and the other half flowing back into the back plate 20. The lines of force are then conducted into the top 10, side 14 and bottom 12 plates and finally back into the magnets 2, completing the magnetic circuit.

The coil assembly 6 is composed of a self-supporting coil winding, and several structural members. These are, in turn, connected to a shaft 11 which protrudes through the front plate 18 of the magnetic actuator and is ultimately connected to the carriage on which the disk read/write heads are mounted. Connecting conductors 16, in the form of sheet springs supply drive current to the coil assembly.

The bore surface of the outer pole 4 is plated with a copper plated sleeve 13. In the preferred embodiment the bore has a 5.167 inch inside diameter and the plated sleeve 13 comprises 0.027 inches of plated low-stress copper. In the preferred embodiment this plated sleeve 13 is plated onto the outer pole 4 but it may be flame-sprayed copper, copper tubing or brased copper sheet. Conductors other than copper are permissible such as silver or aluminimum.

Figure 2:
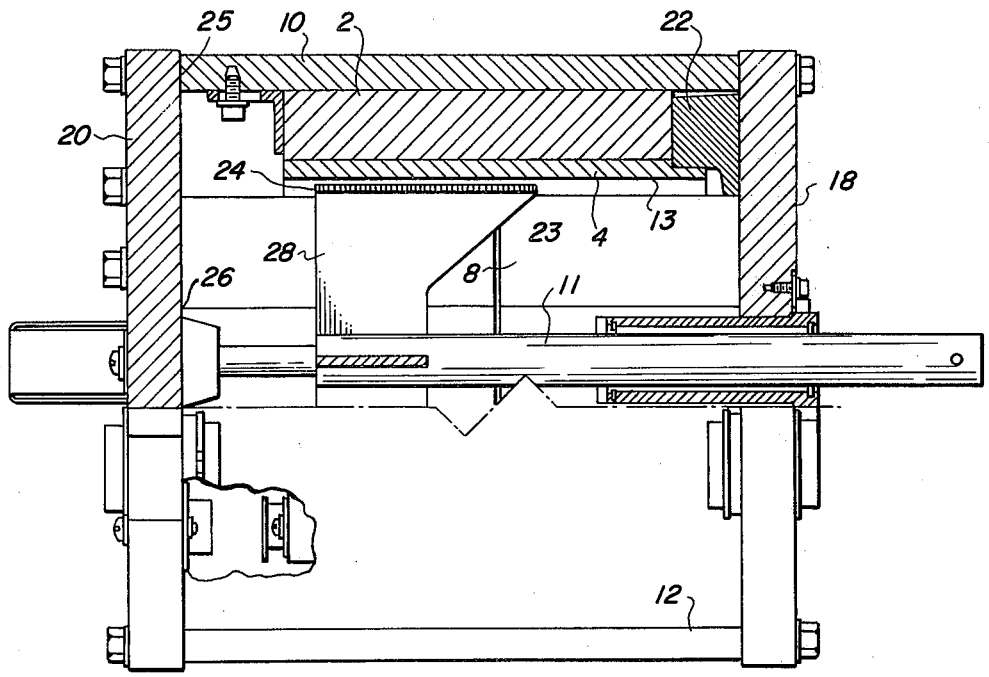
FIG. 2 is a side cross sectional view of the magnetic actuator.

FIG. 2 is a longitudinal cross sectional view showing some features described above. The front plate 18 and the back plate 20 are shown bolted to the top plate 10 and the bottom plate 12. The top magnet 2 is shown bolted to the top plate 10. The outer pole 4 is positioned between the magnets 2 and is held in place with the aid of a positioning block 22. The plated sleeve 13 is shown as the lower surface of the upper portion of the outer pole 4. The coil winding 24 is bonded to the mounting fins 28 which in turn are bonded on the actuator shaft 11. The entire coil assembly 6 is positioned centrally in the outer pole bore.

Figure 3:
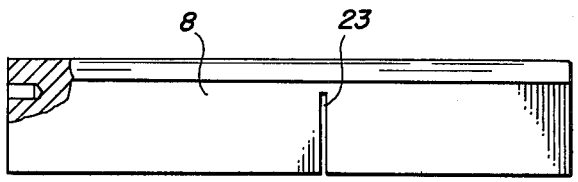
FIG. 3 is a side view of a center pole showing the position of the balancing air gap.
Figure 4:
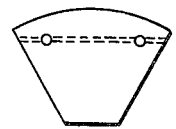
FIG. 4 is an end view of the center pole.

A balancing air gap 23 is cut by a bandsaw into all four center poles 8. These gaps are positioned directly between the center points of the four magnets 2. FIGS. 3 and 4 are longitudinal and end views showing the dimensions of each center pole 8 and the balancing air gap 23.

Figure 5:
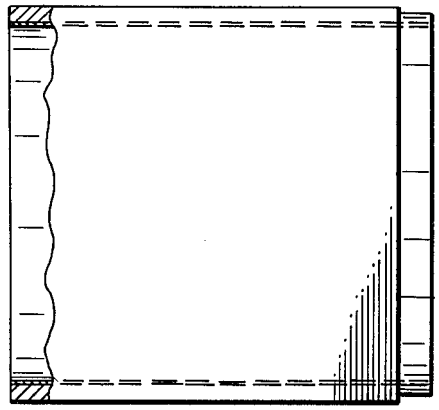
FIG. 5 is a side view of the outer pole.
Figure 6:
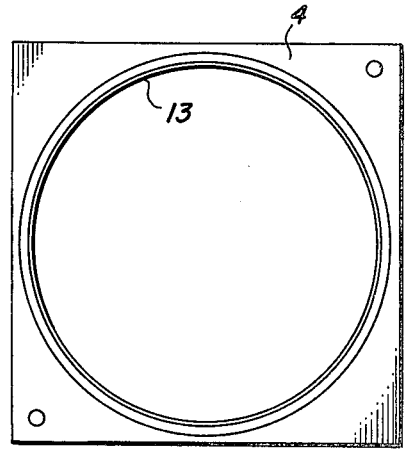
FIG. 6 is a front view of the outer pole.

FIGS. 5 and 6 show the dimensions and orientation within the outer pole 4 of the plated sleeve 13.

The operation of this magnetic actuator may best be seen with reference to the magnetic circuit associated with the top magnet of FIG. 2. The magnetic lines of force flow down through the magnet 2 through the outer pole 4, and into the center pole 8. The magnetic lines of force in the center pole 8 divide with the lines of force entering the center pole 8 to the rear of the balancing air gap 23 flowing to the left into the back plate 20 and the magnetic lines of force entering the center pole 8 to the right to the balancing air gap 23 flowing right into the front plate 18. In both cases, the lines of force run up through the front and back plates into the top plate 10 and from there down into the magnet 2, thus completing the magnetic circuit. The magnetic circuit is arranged so that there is a constant magnetic field over the entire longitudinal dimension of the outer pole 4. In normal operation, shaft 11 travel is such that the entire coil assembly 6 always remains completely within this constant magnetic field.

The balancing air gap 23 is located directly between the center points of all four magnets 2. This gap is at the point where the flux direction reverses in the center pole, and therefore, the discontinuity of the center pole at the balancing air gap has no effect on the permanent magnetic field in the space between the outer pole 4 and the center poles 8. In fact, the air gap has a beneficial effect in forcing equal flux in each direction down the center poles.

Actuator driving current is forced through the coil windings 24. Since the coil winding wires are perpendicular to the lines of force in the permanent magnetic field, a force is generated which will drive the coil assembly 6 forward or backward in the actuator depending on the polarity of the current applied.

When current is applied to the coil windings 24, magnetic lines of force are also generated. These lines of force flow through the four center poles 8 to the back plate 20, through the top 10 and bottom 12 plates, through the front plate 18, and back into the center poles 8. All these structures are made of iron or steel and result in a large coil winding inductance. This inductance limits the speed with which the coil winding current may buildup, and therefore, limits the speed with which the shaft can be driven from one position to another, thereby seriously effecting and degrading the performance of this magnetic actuator. To reduce this inductance, a plated sleeve 13 has been provided at the inner bore surface of the outer pole 4. A large counter current is produced in this plated sleeve which counteracts the magnetic field of the coil winding 24 and reduces the inductance of said coil winding. Alternatively, the plated sleeve 13 may be viewed as a shorted transformer secondary and therefore will reflect back to its primary, in this case the coil winding 24, a very low resistive impedance. The result is a large reduction of inductance allowing a much faster buildup of drive current in the coil windings 24. Also, the resistance can be easily controlled, thus controlling the peak motor current.

As mentioned above, coil winding current produces magnetic lines of force which travel through the center poles as well as the front, back, top, bottom and side plates. Under maximum current conditions, there is a tendency for the structure to saturate at its points of discontinuity. Examples of these points would be the back plate 20 near the top plate 10, at point 25, and the joint between the center pole 8 and the back plate 20 at point 26. If, for example, point 26 saturates, there will be a weakening of the permanent magnetic field in the rear half of the space between the outer pole 4 and the center pole 8 since some of the magnetic lines of force will flow directly from the outer pole 4 to the back plate 20 without going through the center pole 8. This would result in a non-uniformity in the permanent magnetic field over the entire outer pole/center pole gap, resulting in less actuator force and non-uniform performance of the magnetic actuator. To prevent saturation at points 25 and 26, a balancing air gap 23 has been created at a point equidistant from the ends of the magnet 2. As explained above, this gap has no effect on the balanced, permanent magnetic field. However, when a large current is driven through the coil windings 24, the coil winding magnetic circuit will saturate at this balancing air gap instead of point 25 or point 26. This is true since the balancing air gap is machined such that the remaining iron left in the center pole will saturate slightly before points 25 and 26. Since the balancing air gap is parallel to the permanent magnetic field lines of force, its saturation will also have no effect on the permanent magnetic field. Thus, the force exerted by the coil assembly 6 because of coil winding current will be constant regardless of coil assembly position and coil winding current.

FIGS. 3 and 4 show the dimensions of one center pole 8 and the dimensions of the balancing air gap 23 machined into said center pole.

FIGS. 5 and 6 show the dimensions of the outer pole 4, the dimensions of the bore in said outer pole, and the dimensions of the plated sleeve 13 situated on the surface of said bore.

It is to be understood that the above described arrangement is merely illustrative of the principles of the invention. While a particular embodiment of the present invention has been described and illustrated, it will be apparent to those skilled in the art that changes and modifications may be made therein without departure from the spirit and scope of the invention as claimed.

What is claimed is:

1. A linear magnetic actuator comprising:
   an outer pole having substantially perpendicular and equal vertical and lateral exterior dimensions, and having a circular cylindrical bore centrally located about the longitudinal center line of said outer pole,
   magnetic means for generating magnetic lines of force perpendicular to the top, side and bottom exterior surfaces of said outer pole,
   a shaft slidably mounted along said center line of said outer pole and within said outer pole bore,
   a hollow coil assembly of circular cylindrical shape rigidly attached to said shaft with said assembly longitudinal axis coincident with said outer pole center line and having a diameter smaller than the diameter of said bore,
   drive current means for providing varying amounts of d.c. drive current,
   winding means connected to said drive current means and wound around and rigidly attached to said coil assembly and having a radial thickness smaller than the radial dimension of the space between said outer pole and said coil assembly for producing a longitudinal driving force on said shaft when drive current from said drive current means is provided,
   plate means for providing a low-reluctance circuit along the top, side, bottom, front and back external surfaces of said linear magnetic actuator, and
   center pole means connected to said plate means for providing a low reluctance circuit through the interior of said coil assembly to the front and back external surface of said linear magnetic actuator.

2. The apparatus in claim 1 wherein said magnet means comprises permanent magnets having perpendicular dimensions attached to and substantially covering the top, side and bottom exterior surfaces of said outer pole.

3. The apparatus of claim 2 wherein said winding means comprises a single wire wound uniformly around and attached rigidly to said coil assembly.

4. The apparatus of claim 3 wherein said plate means are mild steel plates.

5. The apparatus of claim 4 wherein said linear magnetic actuator further comprises sleeve means rigidly attached to the internal bore surface of said outer pole for generating a bucking current to reduce the inductance of said winding means.

6. The apparatus of claim 5 wherein said center pole means has a reduced cross sectional area at the midpoint of said permanent magnetic field for saturating the magnetic circuit at that point at moments of peak winding means current.

7. The apparatus of claim 5 wherein said center pole means has a balancing air gap cut into said center pole means at the center of the permanent magnetic field, said balancing air gap being cut into said center pole means at the point of zero permanent magnet flux and perpendicular to said shaft axis for reducing the cross sectional area of said center pole means and for saturating said center pole at said balancing air gap at moments of peak winding means current.

8. In a linear magnetic actuator of the type having a magnet for generating a permanent magnetic field, a shaft slidably mounted along an axis parallel to one pole face of said magnet, a coil winding rigidly attached to and wound around said shaft, current means connected to said coil winding for driving current thru said coil winding to produce an axial motion of said shaft, and low reluctance pole means rigidly attached to said magnet for conducting permanent magnetic lines of force from the interior of said coil winding toward both ends of said coil winding and from there to the other pole face of said magnet, the improvement comprising:
a balancing air gap in said pole means at a point corresponding to the center point of the permanent magnetic field for reducing the cross sectional area of said pole means at that center point, for saturating the pole means at that center point during moments of peak coil winding current and for preventing the saturation of said pole means at any other point.

9. The apparatus of claim 8 wherein said balancing air gap is a gap of relatively short longitudinal dimension cut into said pole means at an angle parallel to the permanent lines of force at that center point.

* * * * *